(12) United States Patent
Lucidarme et al.

(10) Patent No.: US 7,324,529 B2
(45) Date of Patent: Jan. 29, 2008

(54) METHOD OF TRANSMITTING IP PACKETS VIA A CELLULAR RADIO COMMUNICATION SYSTEM, AND THE CELLULAR SYSTEM EQUIPMENT FOR IMPLEMENTING THIS METHOD

(75) Inventors: Thierry Lucidarme, Montigny le Bretonneux (FR); Pierre Lescuyer, Montigny le Bretonneux (FR)

(73) Assignee: Nortel Networks Limited, St. Laurent, Quebec (CA)

( * ) Notice: Subject to any disclaimer, the term of this patent is extended or adjusted under 35 U.S.C. 154(b) by 994 days.

(21) Appl. No.: 10/161,363

(22) Filed: Jun. 3, 2002

(65) Prior Publication Data
US 2002/0181468 A1 Dec. 5, 2002

(30) Foreign Application Priority Data
Jun. 1, 2001 (FR) ................................. 01 07254

(51) Int. Cl.
*H04L 12/56* (2006.01)
(52) U.S. Cl. ..................... 370/401; 370/356; 370/467
(58) Field of Classification Search ............ 370/395.2, 370/395.21, 395.3, 468, 477
See application file for complete search history.

(56) References Cited

U.S. PATENT DOCUMENTS

| 6,519,254 | B1 * | 2/2003 | Chuah et al. ............... 370/389 |
| 6,937,566 | B1 * | 8/2005 | Forslow ....................... 370/231 |
| 2001/0027490 | A1 * | 10/2001 | Fodor et al. ................. 709/238 |
| 2002/0036982 | A1 * | 3/2002 | Chen ........................... 370/230 |
| 2002/0126636 | A1 * | 9/2002 | Chen ........................... 370/329 |
| 2002/0194369 | A1 * | 12/2002 | Rawlins et al. ............. 709/238 |

FOREIGN PATENT DOCUMENTS

| EP | 1 035 688 | 9/2000 |
| WO | WO 99 05828 | 2/1999 |

OTHER PUBLICATIONS

Priggouris G et al. : <<Supporting IP QOS in the General Packet Radio Service >>, IEEE Network, vol. 14, n°5, Sep. 2000, Oct. 2000, p. 8-p. 12.

(Continued)

*Primary Examiner*—Brian Nguyen
(74) *Attorney, Agent, or Firm*—Trop, Pruner & Hu, P.C.

(57) ABSTRACT

The invention concerns the dynamic reservation of resources according to the RSVP protocol for transmitting an application flow in the form of first packets between a radio terminal and a remote unit interconnected via a first IP network and a cellular radio communication system. The cellular radio communication system uses a second IP network, or even a third IP network, in its core network. According to the invention, the dynamic reservation of resources in the first IP network is completed by a second dynamic reservation of resources in the second IP network, and where necessary a third dynamic reservation of resources in the third IP network. For this, transmission elements of the cellular radio communication system perform the association between the tunnel identity used for transmitting the first packets of the application flow and the parameters assigned to each RSVP session.

18 Claims, 7 Drawing Sheets

OTHER PUBLICATIONS

Koodli R et al. : "Supporting Packet-Data QOS in Next-Generation Cellular Networks", IEEE Communications Magazine, vol. 39, n°2, Feb. 2001, pp. 180-188.
Mikkonen J et al.: "An Integrated QOS Architecture for GSM Networks" Proceedings of the IEEE 1998 International Conference on Universal Personal Communications (ICUPC '98), Florence, Italy, vol. 1, Oct. 5-9, 1998, pp. 403-407.
Terzis A et al.: <<RSVP Operation Over IP Tunnels >>, IETF RFC 2746, Jan. 2000.
Request For Comments (RFC) 791, Sep. 1981, IETF.
RFC 2474, Dec. 1998, IETF.
RFC 2475, Dec. 1998, IETF.
RFC 1633, Jun. 1994, IETF.
RFC 2205, Sep. 1997, IETF.
Technical Specification 3GPP TS 29.060, version 3.8.0, Mar. 2001, 3GPP-ETSI.
RFC 2460, Dec. 1998, IETF.
RFC 793, Sep. 1981, IETF.
RFC 768, Aug. 28, 1980, IETF.
Technical Specification 3GPP/GSM 03.60, Mar. 2001, 3GPP-ETSI.
Technical Specification 3GPP/GSM 03.64, Apr. 2001, 3GPP-ETSI.
Technical Specification 3GPP/GSM 08.16, Jun. 2000, 3GPP-ETSI.
Technical Specification 3GPP/GSM 09.16, Jul. 1999, 3GPP-ETSI.
Technical Specification 3GPP TS 25.301, Mar. 2001, 3GPP-ETSI.
Technical Specification 3GPP TS 25.410, Mar. 2001, 3GPP-ETSI.
Technical Specification 3G TS 25.413, version 3.2.0, Jun. 2000, 3GPP-ETSI.

* cited by examiner

METHOD OF TRANSMITTING IP PACKETS VIA A CELLULAR RADIO COMMUNICATION SYSTEM, AND THE CELLULAR SYSTEM EQUIPMENT FOR IMPLEMENTING THIS METHOD

BACKGROUND OF THE INVENTION

The present invention relates to signalling techniques aimed at achieving a certain Quality of Service (QoS) for packet transmission networks such as the Internet. In particular, the invention relates to networks operating under the IP protocol (Internet Protocol, see Request for Comments (RFC) 791 published in September 1981 by the Internet Engineering Task Force (IETF)).

It is known that IP networks transport data in the form of packets or datagrams under a mechanism known as "best effort".

Several enhancements have been proposed for the IP protocol in the network layer of the OSI model, for providing much greater quality of service in certain information flows.

Some of these techniques ("Diffserv", see RFC 2474 and 2475 published in December 1998 by the IETF) use special marking of packets at the network boundary, chiefly with the aid of the TOS (Type of Service) field in the IP header. The network's internal routers do not differentiate the flows in terms of quality of service, but only the classes of packets specified by the markings.

The invention rather relates to techniques ("Intserv", see RFC 1633 published in June 1994 by the IETF) that reserve resources in the routers based on the flows processed, which can be identified by the source and destination IP addresses, and the port numbers of the transport protocol layer. The invention is aimed more specifically at those of these techniques that dynamically reserve resources. The most common of these is the RSVP protocol ("Resource reSerVation Protocol", see RFC 2205 published in September 1997 by the IETF).

The resources undergoing such dynamic reservation depend on the specific implementations of the protocol. They may correspond, for example, to portions of bandwidth, or to portions of packet buffer memories.

Reserving such resources requires signalling procedures to establish and maintain states in the routers encountered along the packet path in the network. These procedures entail transmitting special datagrams along the path. Packet routing then takes place taking into account the states thus established and maintained.

RFC 2746, "RSVP Operation over IP Tunnels", published in January 2000 by the IETF describes how to implement RSVP in IP tunnels carrying IP traffic (see also EP-A-1 035 688). This IP traffic is in the form of datagrams of an inner IP layer, or IP application layer. The "tunnel" is formed between two routers of this outer layer, where these datagrams are encapsulated in the datagrams of an outer IP layer, or IP transport layer, linking up these two routers (this outer layer is viewed as belonging to level 2 of the OSI model from the inner layer). The above documents describe how to associate RSVP sessions of the inner layer with RSVP sessions of the outer layer in response to the detection of outer layer signalling datagrams by the tunnel end routers.

The RFC 2746 mechanism is based on an observation of the datagrams of the inner layer at the two ends of the tunnel and on specific information exchanges between the routers located at these endpoints. It is not applicable when one of the tunnel ends is not capable of analysing the IP datagram headers of the inner layer.

Yet there are network architectures that use IP tunnels for carrying IP traffic without the ends of these tunnels having the ability to analyse IP traffic as a matter of course. The aforementioned mechanism then proves deficient.

This situation is encountered especially in cellular radio communication networks enabling wireless access to packet networks, especially of the IP type (Intranet or Internet). Some second generation cellular networks (GSM, Global System for Mobile communications) now include a packet transmission service called GPRS (General Packet Radio Service). The third generation cellular systems, especially UMTS (Universal Mobile Telecommunications System), are designed with multimedia in mind, and therefore incorporate such packet transmission services.

These cellular systems include a core network performing communication and user management functions, and one or more radio access networks that supply the links between the infrastructure and the radio terminals.

In the aforementioned systems (GPRS, UMTS), the core network is based on IP technology. Accordingly, when a terminal exchanges data in the form of IP datagrams, these data undergo double IP encapsulation in the core network. An inner IP layer links the radio terminal with the packet network (Internet or Intranet). A core network switch, called a GGSN (Gateway GPRS Support Node) forms the packet network edge router with which the terminal exchanges its IP datagrams in a single hop of the inner IP layer. In the core network, these IP datagrams are incorporated into data units of a GTP tunnelling protocol (GPRS Tunnelling Protocol, see technical specification 3GPP TS 29.060, version 3.8.0 published in March 2001 by the 3GPP ($3^{rd}$ Generation Partnership Project)), themselves encapsulated in datagrams of an outer IP layer linking the GGSN with the terminal serving switch called an SGSN (Serving GPRS Support Node).

The IP/GTP/IP tunnel extends from the GGSN to the SGSN. One of its ends (the SGSN) does not have the functionalities of an inner IP layer router. In particular, it does not have the ability of the GGSN to analyse the header and possibly a part of the data of the inner IP layer datagrams.

In a typical scenario, an "Intserv" service such as RSVP is provided between one terminal and another terminal or remote server connected to the packet network (Internet or Intranet). The signalling datagrams are thus processed by the routers of the inner IP layer, which can reserve the required resources if they are available. A weak link in this chain may be the outer IP layer between the GGSN and the SGSN, which generally applies to a "best-effort" mechanism. In fact, a mesh network may exist between the GGSN and the SGSN comprising a large number of routers.

As the SGSN does not have this functionality of analysing the IP datagram headers of the inner IP layer, the RFC 2746 mechanism is not applicable in the tunnel.

Giving SGSNs an ability to analyse the data fields (payload) of the outer IP layer datagrams for the sole purpose of detecting possible RSVP signalling packets from the inner IP layer would be a very complex and costly solution, noting that these RSVP packets represent only a very small fraction of the total traffic.

Accordingly, the RSVP signalling relay mechanism suggested in RFC 2746 and EP-A-1 035 688 cannot be applied to cellular networks. Thus, the traffic in the core network, including the traffic that mostly makes do with "best-effort"

service, may hinder supplying the quality of service required for an RSVP flow. This reduces the ability of the cellular operator to offer its customers dynamically reserved "Intserv" services.

In "Supporting IP QoS in the General Packet Radio Service", (IEEE Network, September/October 2000, pp. 8-17), G. Priggouris et al. describe an adaptation of a GPRS network for providing Diffserv and Intserv type services. According to this article, the GGSN responds to the receiving of a PATH packet of the RSVP protocol in the inner IP layer by sending to the SGSN an initialization message of another RSVP session in the outer layer. Such operation requires a non-standard implementation of RSVP in the outer layer, which complicates the design of the SGSN especially. Moreover it leads to, in an under-optimum way, triggering steps for establishing a tunnel as the reservation may fail in the outer layer.

SUMMARY OF THE INVENTION

One aim of the present invention is to propose a mechanism for simple an efficient implementation, allowing a cellular operator to offer RSVP services to his clients.

The present invention concerns a method of transmitting packets along a first IP network via a cellular radio communication system having equipment interconnected through the intermediary of a second IP network. This equipment comprises at least a gateway router having a first interface for exchanging first packets along the first IP network and a second interface for exchanging second packets along the second IP network. This equipment also comprises at least a switching node having a first interface with a radio access network making links with radio terminals and a second interface for exchanging second packets along the second IP network. At least some of the radio terminals include means of communication along the first IP network via the cellular system, the gateway router constituting, in the first IP network, an edge router that exchanges the first packets with said terminals in a single hop of the first IP network. Each of these first exchanged packets is encapsulated in at least one data unit of a tunnel protocol implemented between the second interfaces of a gateway router and a switching node, said data unit including a tunnel identity and itself being encapsulated in at least one second packet. The transmission method comprises the following steps:

detecting first signalling packets carrying RESV messages of the RSVP protocol concerning a first session of the RSVP protocol in the first IP network relative to an application flow of first packets between a radio terminal and a remote unit connected to the first IP network;

in response to the detection of at least some of the first signalling packets, associating a second session of the RSVP protocol in the second IP network with a tunnel identity included in the data units in which the first packets of the application flow are encapsulated, said second session being relative to a flow of second packets in which said data units are encapsulated between a gateway router and a switching node; and transmitting second signalling packets in the second IP network for establishing and/or updating the parameters of the second session associated with said tunnel identity.

In order to achieve consistent resource reservation between the two IP networks, the second RSVP session used in the second IP network is advantageously determined according to the characteristics of the first RSVP session used in the first IP network. To do this, the association of the second RSVP session with said tunnel identity includes assigning quality-of-service parameters to the second RSVP session selected according to quality-of-service parameters assigned to the first session and obtained from the first signalling packets detected.

According to the known method of operation of the RSVP protocol, a session of this protocol is initialized in the first IP network by a signalling packet forming a PATH message transmitted by the source of the application flow to the remote destination unit. In response, this remote unit sends back to the source a signalling packet forming a RESV message. This RESV message notifies the availability of sufficient resources in each of the transmission elements located on the path between the destination unit and the router that processes it with respect to the quality of service requested by the PATH message. It is propagated up to the source, which begins to transmit the flow packets if adequate resources have been able to be reserved all along the path.

The step of detecting the first signalling packets is preferably performed at the first interface of the gateway router.

The application flow of first packets may be a downlink flow, from the remote unit connected to the first IP network to a radio terminal, or an uplink flow, from a radio terminal to the remote unit connected to the first IP network.

In the case of a downlink application flow, in response to the detection of the RESV message, the gateway router associates the second RSVP session with the tunnel identity included in the data units in which the first packets of the application flow are encapsulated. The gateway router then sends a signalling packet carrying an RSVP protocol PATH message on the second IP network, to the switching node. Dynamic resource reservation is then performed between the gateway router and the switching node in the second IP network, separately from the first IP network, following the RSVP protocol standard procedure.

In the case of an uplink application flow, the transmission of the RSVP protocol PATH message in the second IP network is carried out by the switching node in the direction of the gateway router. For this, in response to the detection of at least some of the first signalling packets at the first gateway router interface, this gateway router first transmits a control message to the switching node, via the second IP network. This control message belongs to a control plane of the tunnel protocol and designates the tunnel identity included in the data units in which the first packets of the application flow are encapsulated. This control message also contains at least some of the quality-of-service parameters of the first RSVP session.

In response to the detection of this control message, the switching node then associates the second RSVP session internal to the second IP network with the tunnel identity designated in this control message. It then sends to the gateway router, on the second IP network, a signalling packet carrying a PATH message corresponding to this second RSVP protocol session. Dynamic IP resource reservation is then performed between the switching node and the gateway router in the second IP network, separately from the first IP network, following the RSVP protocol standard procedure.

Thus, according to the invention, in both cases of an application flow, downlink and uplink, reserving resources in the first IP network gives rise to reserving resources in the second IP network. If this reservation fails, the transmission along the second IP network may be in "best-effort" mode.

A homogeneous, global resource reservation session is accordingly set up on both IP networks.

In some cellular systems, other transmission elements of the radio access network are also connected to the preceding switching nodes via another IP network. These other transmission elements are chiefly control units provided with network interfaces communicating with the first access interface of at least one switching node through the intermediary of a third IP network. At least one part of the existing tunnel protocol between the gateway router and the switching node is implemented between the network interfaces of said control units and the first access interface of the switching node.

In preference, the packet transmission method according to the invention then includes, in response to the association with a tunnel identity of a second RSVP session relative to a flow of second packets in which data units of the tunnel protocol are encapsulated between a gateway router and a switching node, the association with said tunnel identity of a third RSVP session in the third IP network, for transporting between the switching node and a radio access network control unit, IP packets in which said data units are encapsulated.

For a downlink application flow, the switching node associates a third RSVP session with said tunnel identity. Third signalling packets are then exchanged in the third IP network to set up and/or update parameters of this third RSVP session. The switching node then sends a PATH message corresponding to this third RSVP session, on the third IP network. Dynamic IP resource reservation is then performed between the control unit and the switching node in the third network, separately from the first and second networks, according to the RSVP standard procedure.

For an uplink application flow, the association of a third RSVP session with said tunnel identity is performed by the control unit. For this, in response to the switching node receiving the first control message sent by the gateway router, the switching node transmits a second control message to the control unit, designating the tunnel identity included in the data units in which the first packets of the application flow are encapsulated. This second control message reproduces at least a part of the data contained in the first control message. Furthermore, it falls under a specific communications protocol between the switching node and the control unit.

The third RSVP session in the third IP network is then initialized by the control unit by sending a PATH message to the switching node.

Another aspect of the present invention relates to a cellular radio communication system including network equipment set up to use a method as defined above, as well as some of this equipment.

The invention is thus aimed at a gateway router having a first interface for exchanging first packets along a first IP network and a second interface for exchanging second packets along a second IP network, and forming an edge router of the first IP network, set up to exchange first packets with radio terminals in a single hop of the first IP network. Each of these first exchanged packets is encapsulated in at least one data unit of a tunnel protocol implemented between said second interface and a switching node, said data unit including a tunnel identity and itself being encapsulated in at least one second packet exchanged along the second IP network. This gateway router according to the invention comprises:

means for detecting on the first interface first signalling packets carrying RESV messages of the RSVP protocol concerning a first session of the RSVP protocol in the first IP network relative to an application flow of first packets between a radio terminal and a remote unit connected to the first IP network;

means for associating, in response to the detection of at least some of the first signalling packets, a second RSVP session in the second IP network with a tunnel identity included in the data units in which the first packets of the application flow are encapsulated, said second RSVP session being relative to a flow of second packets in which said data units are encapsulated between said second interface and a switching node;

means for transmitting second signalling packets in the second IP network for establishing and/or updating parameters of the second RSVP session associated with said tunnel identity.

According to another aspect, the invention concerns a cellular radio communication system core network switching node, comprising a first interface with a radio access network providing links with radio terminals and a second interface for exchanging packets along an IP network with at least a gateway router, said packets carrying data units of a tunnel protocol supported by the second interface, each data unit including a tunnel identity and data forming either a control message if the data unit belongs to a control plane of the tunnel protocol, or user data if the data unit belongs to a user plane of the tunnel protocol. This switching node also includes means for associating, in response to receiving from a gateway router a tunnel protocol special data unit belonging to the control plane, an RSVP session in said IP network with a tunnel identity designated in the control message of said special data unit and transmitting to said gateway router at least one signalling packet in the IP network for setting and/or updating parameters of the RSVP session associated with the tunnel identity designated in the control message, said RSVP session being relative to a packet flow in which tunnel protocol data units are encapsulated that belong to the user plane and contain the tunnel identity designated in the control message.

The first interface of the switching node to which the invention applies also supports the IP protocol, as well as the user plane of the tunnel protocol for communicating with control units of the radio access network. According to the invention, the switching node further includes means for associating, in response to the association with a tunnel identity of an RSVP session relative to a flow of packets in which data units of the tunnel protocol belonging to the user plane and containing a tunnel identity are encapsulated between the switching node and a gateway router, another RSVP session with the tunnel identity, for transporting between the switching node and a radio access network control unit, IP packets in which the data units are encapsulated.

Finally, the invention proposes a cellular radio communication system radio network controller, comprising a first communications interface with radio terminals and a second interface for exchanging packets along an IP network with at least a switching node, said packets carrying user data units of a tunnel protocol supported by the second interface, each user data unit including a tunnel identity. This radio network controller further includes means for associating, in response to receiving a control message from a switching node designating a tunnel identity, an RSVP session in said IP network with the tunnel identity designated in the control message and transmitting to said switching node at least one signalling packet in the IP network for setting and/or updating parameters of the RSVP session associated with the tunnel identity designated in the control message, said RSVP session being relative to a packet flow in which are encapsulated data units of the tunnel protocol containing the tunnel identity designated in the control message.

DETAILED DESCRIPTION OF THE INVENTION

Figure 1:
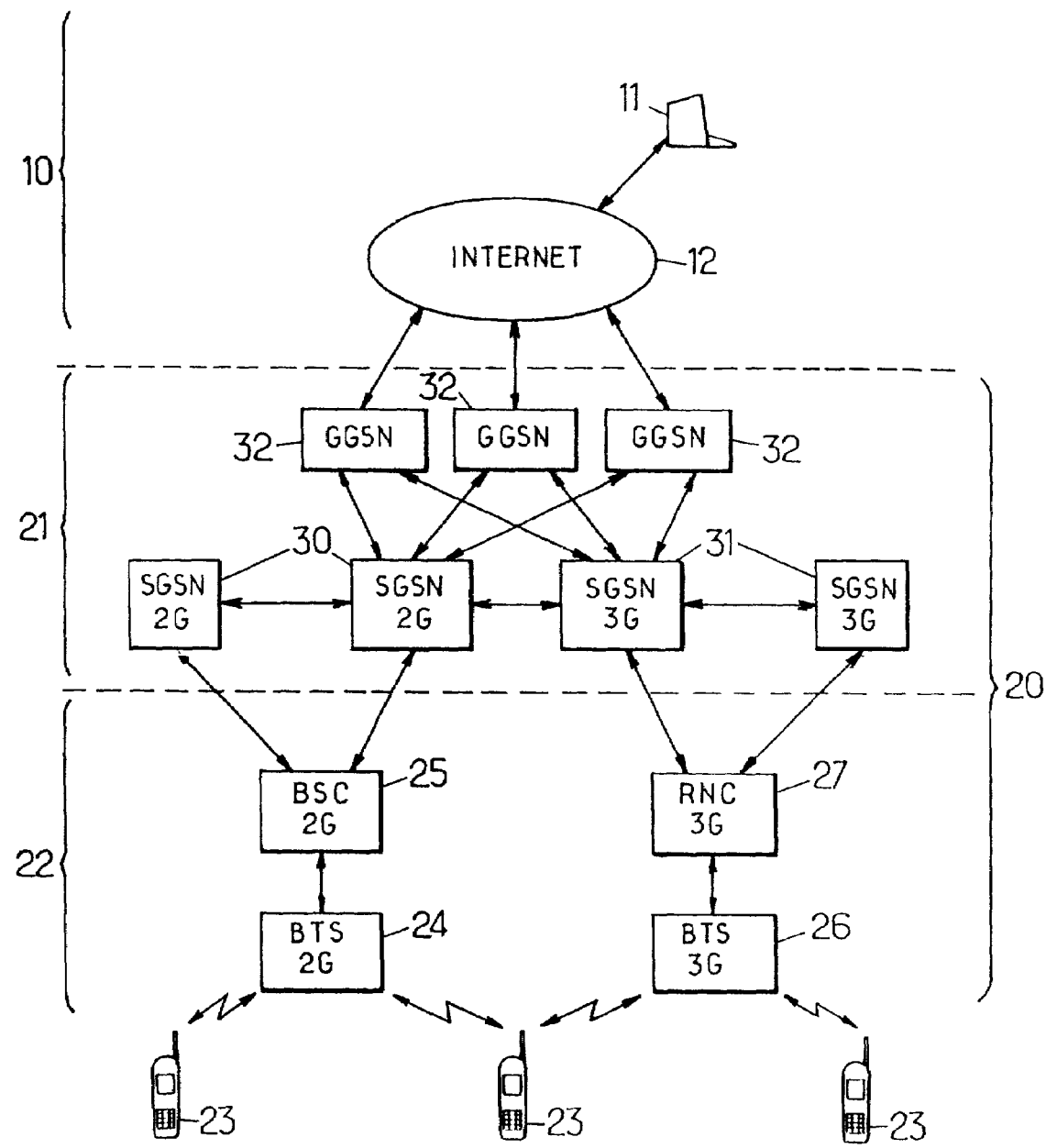
FIG. 1 is a general diagram of a communications system architecture to which the invention can be applied.

The communications system shown diagrammatically in FIG. 1 comprises a fixed part 10 and a cellular communications system 20. The fixed part 10 comprises an IP network 12, the Internet or an Intranet for example. This network 12 operates standardly according to the IP protocol (see RFC 791 of the IETF for version 4, and RFC 2460 of the IETF for version 6). Remote units 11 (IP servers or terminals) are connected to the IP network 12.

The cellular radio communication system 20 is standardly divided into a core network 21, comprising interconnected packet switches, and an access network 22 providing the radio links with the mobile radio terminals 23.

In the example shown, the cellular radio communication system 20 combines second generation elements (GSM) and third generation elements (UMTS). In GSM, the access network 22, called a BSS (Base Station Subsystem), is composed of base stations (BTS) 24 distributed over the coverage area for communicating by radio with mobile terminals 23, and base station controllers (BSC) 25 connected to the core network 21. In the case of UMTS, the access network 22, called an RNS (Radio Network System), is composed of base stations (BTS) 26 and radio network control (RNC) units 27 connected to the core network 21.

The core network 21 switching nodes are called GSN (GPRS Support Node). The switching nodes 30, 31 connected to the access network 22 are called SGSN (Serving GSN) and act as the mobile terminal 23 serving switch. Other switching nodes 32 of the core network 21, called GGSN (Gateway GSN), are gateway routers connected to the IP network 12. These GGSN 32 are connected to the SGSN 30, 31 to enable the mobile terminals 23 to access the IP network 12. FIG. 1 shows several GGSN 32, which may correspond to gateway routers run by different suppliers called ISPs (Internet Service Providers).

Figure 2:
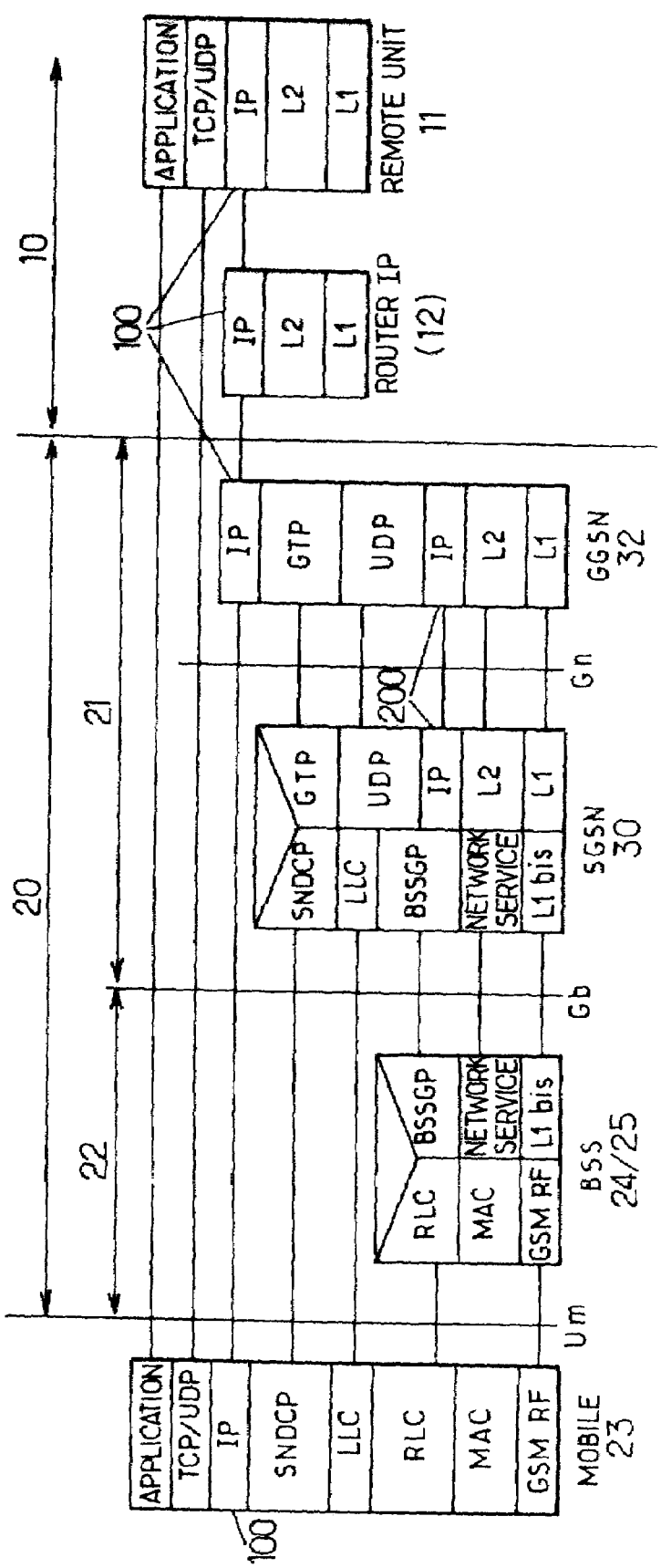
FIGS. 2 and 3 are diagrams illustrating communications protocol stacks used in system entities of FIG. 1, in the case of second and third generation cellular systems respectively.
Figure 3:
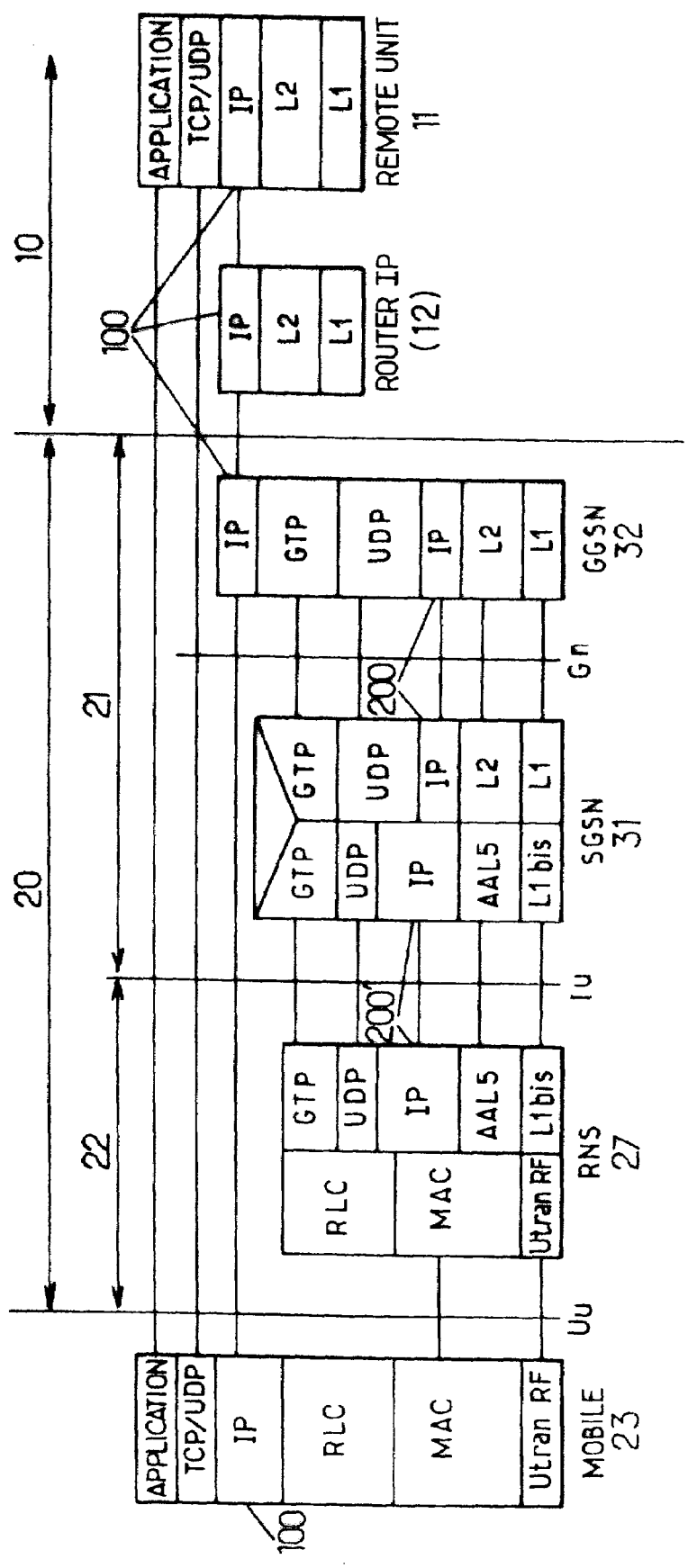

FIGS. 2 and 3 are illustrations of the protocols capable of being implemented in packet mode communications between a mobile terminal 23 and a remote unit 11. This remote unit 11 is accessible via one or more IP routers belonging to the IP network 12. In both cases, the protocols used are the same in the fixed part 10 and at the interface Gn between the GGSN 32 and the SGSNs 30, 31. In the IP network 12, above layers 1 and 2 of the OSI model (L1, L2), IP is used as the network protocol. The same IP layer 100 is present in the mobile terminals 23 when they access the IP network 12. This access may take place during TCP (Transmission Control Protocol , RFC 793 of the IETF) sessions, or by UDP (User Datagram Protocol, RFC 768 of the IETF) datagram exchange, to enable applications run in the mobile 23 and the remote unit 11 to exchange data grouped into flows, called application flows.

The protocols used in the radio communication system 20 are described, for the second generation (FIG. 2), in GSM Recommendations 03.60, 03.64, 08.16 and 09.16 published by the ETSI (European Telecommunications Standards Institute), and for the third generation (FIG. 3) in specifications 3G TS 25.301 and 3G TS 25.410 published by the 3GPP.

At the "Gn" interface, additional IP 200 and UDP layers, as well as a GTP protocol layer, are present between layer 2 and the IP layer 100 corresponding to that of the mobile terminal 23.

In the third generation UMTS network, additional IP 200', UDP and GTP layers are also present at the "Iu" interface between the SGSN 31 and the RNC 27. The IP network on which the IP layer 200' is deployed for exchanges between the RNC and the SGSN is based on a link-layer adaptation protocol AAL 5. It can be the same IP network as that serving the SGSN/GGSN exchanges, or a different network. In the case of GPRS (FIG. 2), the SGSN 30 communicates under other protocols with the BSC 25 and the mobile terminal 23.

The GGSN 32 located at the interface between the cellular core network 21 and the IP network 12 therefore includes an IP layer 100 router common to the IP network 12 and the mobile terminal 23. Transmission between a GGSN and a mobile terminal is performed along this inner IP layer 100 in a single hop, the GGSN forming an edge router. As for the SGSNs 30, 31, they do not possess this IP layer 100, and consequently do not have access to the packets transmitted between the remote unit 11 and the mobile terminal 23, along the IP network 12 via the GGSN 32. On the other hand, the SGSNs 30, 31 share the second IP layer 200 with the GGSNs 32, as well as the GTP and UDP protocol layers.

It is assumed here that the IP network 12 and the core network support IP network are both equipped to implement the RSVP protocol.

For transmitting between the GGSN and the SGSN, the IP packets of the layer 100 are encapsulated in GTP protocol data units.

The transmission of data units via the GTP protocol level is achieved by allocating a tunnel, called the GTP tunnel, to a communication. This allocation prior to the transmission of data proceeds by creating a PDP (Packet Data Protocol) context, which assigns an identifier called a TEID (Tunnel Endpoint Identifier) to this tunnel.

In order to be transmitted in the core network 21, the GTP data units are encapsulated in UDP/IP packets of layer 200. These IP packets are transmitted on the IP support network between the GGSN 32 and the SGSN 30, 31. In the case of a third generation cellular system, IP transmission may also take place between the SGSN 31 and the RNC 27.

Figure 4:
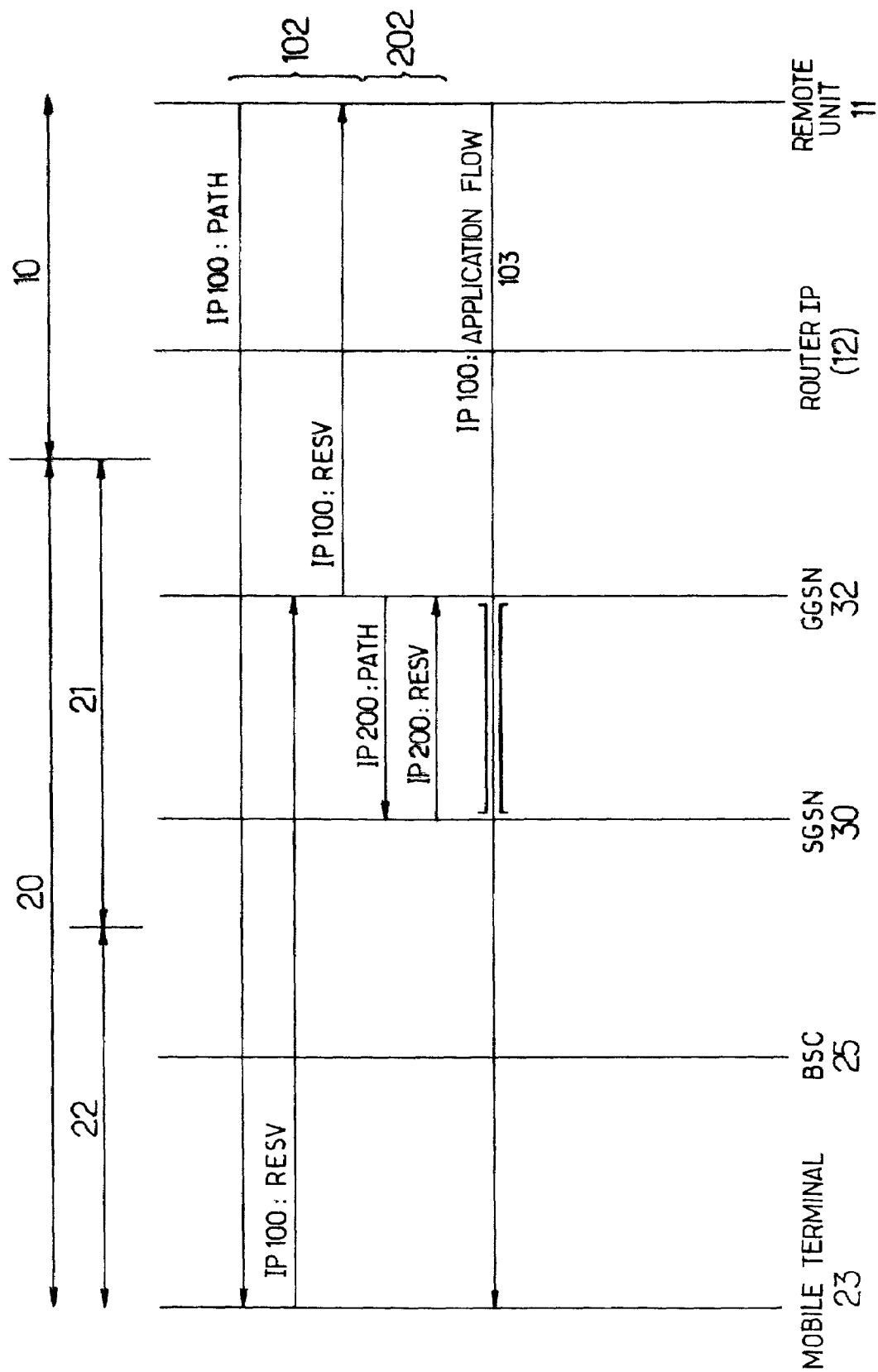
FIG. 4 is a diagram illustrating various messages exchanged for handling a downward RSVP flow in a method according to the invention implemented in a second generation cellular network connected to an IP network.
Figure 5:
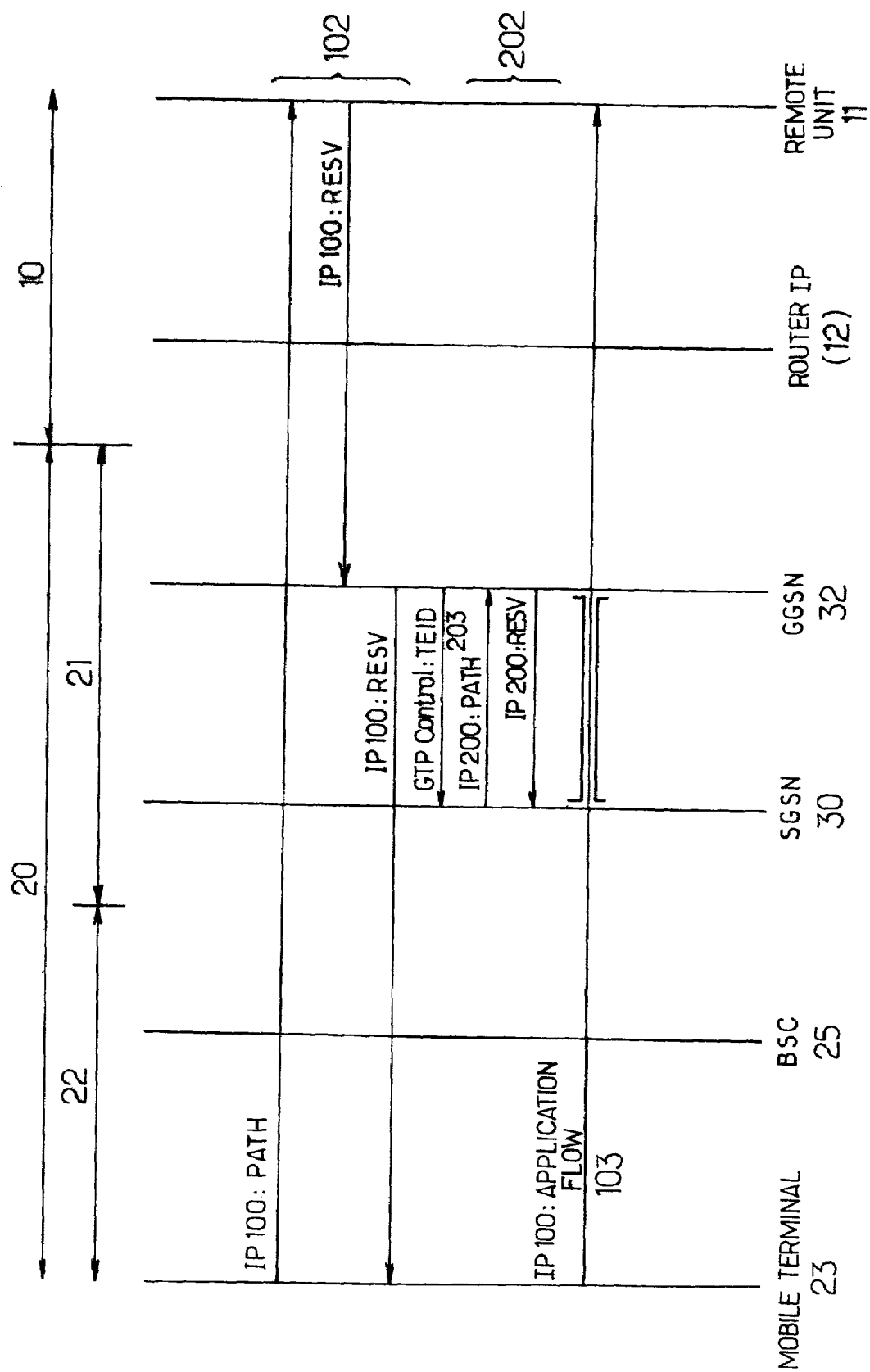
FIG. 5 is a diagram similar to that in FIG. 4 in the case of an upward RSVP flow.

FIGS. 4 and 5 illustrate a method of processing RSVP flows of layer 100 in a GPRS network using protocols according to FIG. 2. It is assumed that the core network 21 already takes into account, in an intrinsically known way (see the aforementioned specification 3GPP TS 29.060), a PDP context for the mobile terminal concerned 23, this PDP context in particular including a GTP tunnel identifier between the GGSN and the SSGN (TEID).

For an application flow forming the object of an RSVP dynamic reservation session, this reservation procedure is standardly performed between the remote unit 11 and the mobile terminal 23, as specified in RFC 2205. For this, the source of the application flow, i.e. the remote unit 11 for a downlink application flow (FIG. 4), or the mobile terminal 23 for an uplink application flow (FIG. 5), sends an IP layer 100 PATH message to the destination address. In FIGS. 4 and 5, reference 102 designates the messages exchanged for establishing or maintaining these RSVP sessions at the level of the IP layer 100.

The PATH message, in addition to the IP address and the UDP port number of the application flow source (FilterSpec), contains data (FlowSpec) describing the quality of service required for the application flow.

In response to this PATH message, the recipient of the application flow sends back an IP layer 100 RESV message to the source. This RESV message is relayed by all the transmission elements from the destination to the source, and indicates the availability of sufficient resources in each of these elements with respect to the PATH message request, by confirming that these resources have been duly reserved. The GGSN 32 also makes the required reservations when it receives this RESV message at its interface with the inner IP layer 100.

In response to the detection by the GGSN of these messages 102, and in particular the RESV message, actions are carried out within the framework of an outer IP layer 200 RSVP session between the GGSN and the SGSN. In FIGS. 4 and 5, reference 202 designates the messages exchanged for establishing or maintaining these RSVP sessions at the level of the IP layer 200. When the PATH/RESV exchange detected in the inner layer 100 relates to establishing a new RSVP session, the same applies in the outer layer 200. Similarly, when the PATH/RESV exchange detected in the inner layer 100 relates to updating an existing RSVP session, update messages are also exchanged in the outer layer 200.

For a downlink application flow (FIG. 4), while pursuing the RSVP procedure in the IP layer 100, the GGSN 32 associates a second RSVP session carried via the IP layer 200 with the GTP tunnel TEID allocated to the terminal 23 (according to its PDP context).

For identifying IP datagrams belonging to this second RSVP session, the FilterSpec parameters of this second RSVP session include the IP address of the GGSN 32 in the IP network of the outer layer 200, together with a UDP port number allocated to this session by the GGSN. The UDP port number is allocated by the GGSN at the time of detecting the first RESV message relative to the application flow, which makes the first association with the corresponding TEID. Subsequently, for the GGSN the association consists in retrieving the appropriate TEID/UDP port pair in memory, based on the FilterSpec parameters specified for the RSVP session of the inner layer 100.

The FlowSpec quality-of-service parameters of the second RSVP session carried by the IP layer 200 are determined according to those of the first RSVP session carried by the IP layer 100 and where applicable according to the PDP context.

Having detected the outer layer 100 RESV message and performed the required association with the GTP tunnel and the second session, the GGSN sends a PATH message to the SGSN consisting of a layer 200 IP packet containing the required parameters complying with the RSVP specifications. When the resources requested have been able to be reserved by the SGSN and by any router in the layer 200 that may be present between the SGSN and the GGSN, the latter receives the RESV message from the SGSN.

It can then convey the application flow traffic in the established GTP/RSVP tunnel to the SGSN (reference 103 in FIG. 4). The quality-of-service application flow thus enjoys resource reservation between the GGSN 32 and the SGSN 30 in the IP layer 200, contributing to the overall quality of service delivered. In particular, the risks are reduced of seeing the first session, established for the application flow in layer 100, being adversely affected owing to a "best-effort" transmission in the core network 21.

For a uplink application flow (FIG. 5), the GGSN 32 cannot send the PATH message to the SGSN since the data of the flow will circulate in the opposite direction. It sends the SGSN 30 the TEID identifier of the GTP tunnel through which it receives the uplink packets containing the source IP address indicated in the FilterSpec parameters. This TEID identifier is found in the GTP header of the data units encapsulating the uplink packets of the flow in question.

To send the TEID to the SGSN, a special message 203 can be used from the GTP-C control plane of the GTP protocol. This control message 203 can be flagged by a specific value set in the message-type field of the GTP header (see technical specification 3GPP TS 29.060, v8.3.0, paragraph 7.1).

To define the quality-of-service parameters appropriate to the RSVP session of the outer layer 200, this control message 203 may have fields provided for conveying the FlowSpec parameters of the IP layer 100 RSVP session, which the GGSN obtains in the PATH/RESV signalling.

For this uplink direction of the application flow, according to the invention, the SGSN 30 then performs an association between the TEID of the GTP tunnel and the second RSVP session carried by the IP layer 200. The SGSN determines the relevant parameters of this second session by the same method as that followed by the GGSN 32 in the case of a downlink application flow: the first time, it allocates a UDP source port number to distinguish the new tunnel session, and it sends a PATH message with FlowSpec parameters determined according to those of the first RSVP session, which have been indicated by the GGSN in the message 203 and where applicable according to the PDP context. For updates of an existing session, the SGSN retrieves the TEID/UDP port into memory for generating the PATH message in the IP layer 200.

The second RSVP session is then continued in the standard way between the SGSN 30 and the GGSN 32.

Just as for the downlink direction of application flow transmission, if the initiation of the RSVP session at the level of the IP layer 100 has ended in a positive balance of available resources in all the intermediate transmission elements between the mobile terminal 23 and the remote unit 11, the transmission 103 of the application flow is begun with the requested quality of service. This transmission 103 further benefits, according to the invention, from resource reservation between the SGSN 30 and the GGSN 32 at the level of the IP layer 200, contributing to the overall quality of service delivered.

In the event that the first RSVP session fails after the GGSN 32 receives the RESV message, and that this GGSN 32 has already initiated the RSVP tunnel session, the GGSN 32 must interrupt the latter at the level of the IP layer 200. This interruption is initiated by the GGSN 32 when it detects the RESV-ERROR failure message of the first RSVP session, on its interface with the IP layer 100. For a downlink application flow, it retrieves the parameters of the RSVP session and sends a signalling packet carrying a RESV- ERROR type message to the SGSN 30. For an uplink application flow, the GGSN 32 sends a signalling packet carrying a PATH-ERROR type message back to the SGSN 30 (another special GTP-C message may also be allowed for).

The previously described method is similarly applicable between the GGSN 32 and the SGSN 31 in a third generation cellular system (FIG. 3).

In this case, we may go farther by also creating RSVP sessions between the SGSN 31 and the RNC 27 when this also communicates with the SGSN according to the IP and GTP protocols via the "Iu" interface.

Figure 6:
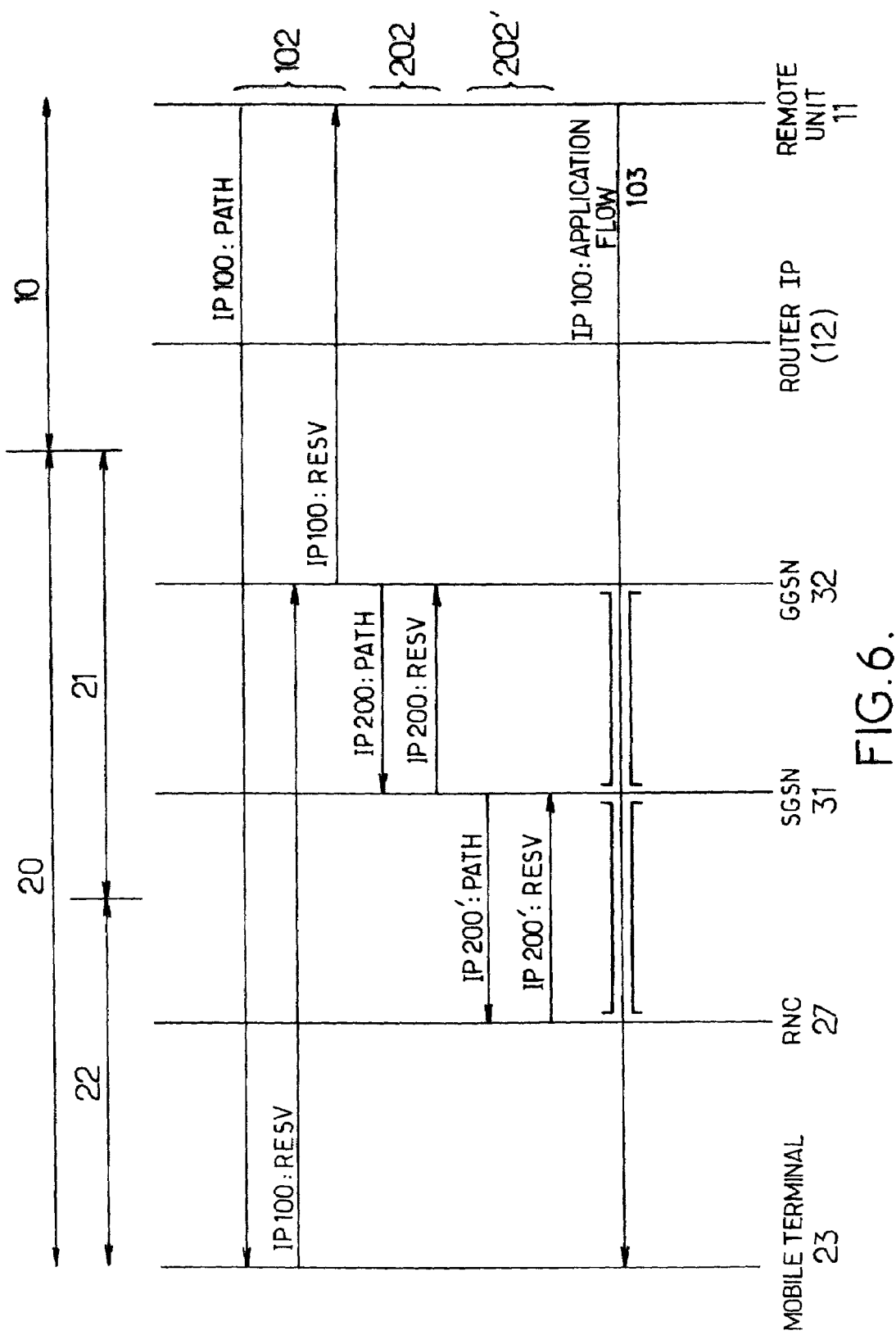
FIGS. 6 and 7 are diagrams respectively similar to those in FIGS. 4 and 5 in an implementation of the method according to the invention in a third generation cellular network connected to an IP network.

For a downlink application flow, as in FIG. 6, the RSVP session is extended to the GTP tunnel existing between the SGSN 31 and the RNC 27. The SGSN 31 receives from the GGSN 32 an IP layer 200 PATH message relative to the second RSVP session in the manner previously described. It then continues the RSVP procedure 202 in a standard fashion, at the level of the IP layer 200. Simultaneously, the SGSN 31 makes another association between the TEID identifier of the GTP tunnel and a third RSVP session. This other association is made in a similar way to the first association carried out by the GGSN 32. The SGSN 31 identifies the parameters of this third RSVP session according to those of the second RSVP session contained in the PATH message received by this SGSN relative to this second session, and where applicable according to the PDP context. This third RSVP session is carried by the IP layer 200' and is continued normally between the SGSN 31 and the RNC 27 by the circulation of messages 202' shown in FIG. 6.

Figure 7:
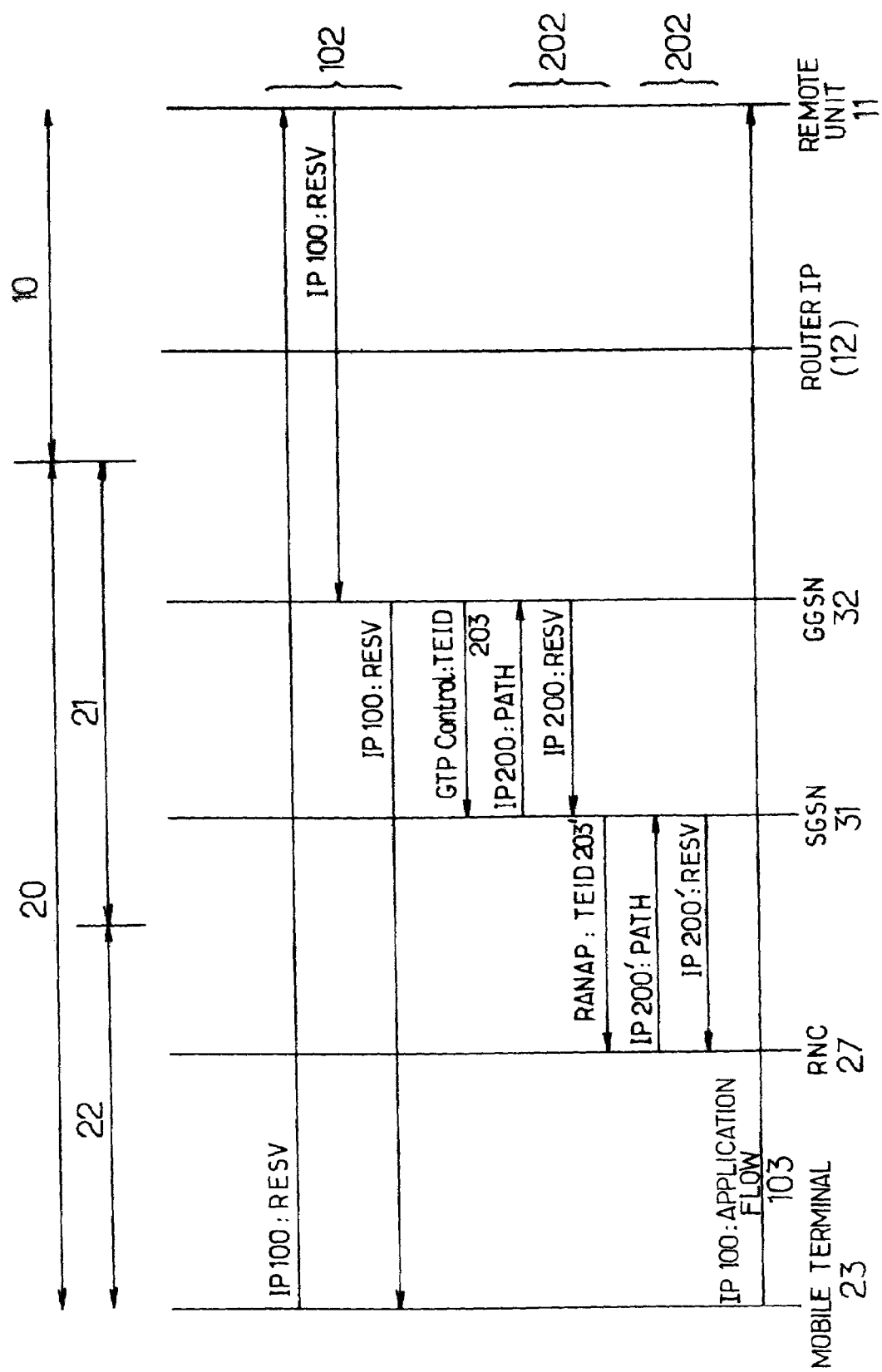

For an uplink application flow, as in FIG. 7, the SGSN 31 receives the special GTP-C message 203 from the GGSN 32 in the manner previously described. It then initializes the RSVP session at the level of the IP layer 200. The message 203 contains the TEID identifier of the GTP tunnel through which it receives the uplink packets. In its turn, the SGSN 31 sends a special message 203' to the RNC 27, for it to re-transmit the TEID identifier. This control message 203' is carried by the IP layer 200', and may for example fall under the RANAP protocol (Radio Access Network Application Part, see technical specification 3G TS 25.413, version 3.2.0 published in June 2000 by the 3GPP) used at the "Iu" interface between the SGSN 31 and the RNC 27. It reproduces at least a part of the parameters of the control message 203. The RNC 27 then performs another association between this TEID and a third RSVP session. To do so, it proceeds in the same way as the SGSN 31 for the second RSVP session. This third RSVP session is set up in the IP layer 200' and is continued normally between this RNC 27 and the SGSN 31 by the circulation of messages 202' shown in FIG. 7.

The invention claimed is:

1. Method for transmitting packets along a first IP network via a cellular radio communication system having equipment connected between them through the intermediary of a second IP network, the equipment comprising at least a gateway router having a first interface for exchanging first packets along the first IP network and a second interface for exchanging second packets along the second IP network, and at least a switching node having a first interface with a radio access network providing links with radio terminals and a second interface for exchanging at least some of the second packets along the second IP network, wherein at least some of the radio terminals include means of communication along the first IP network via the cellular system, the gateway router forming, in the first IP network, an edge router which exchanges at least some of the first packets with the terminals in a single hop of the first IP network, each of the first packets exchanged being encapsulated in at least one data unit of a tunnel protocol implemented between the second interfaces of the gateway router and the switching node, the data unit including a tunnel identity and itself being encapsulated in at least one second packet, the method comprising the following steps:

detecting first signalling packets carrying RESV messages of an RSVP protocol concerning a first RSVP session in the first IP network relative to an application flow of at least some of the first packets between a radio terminal and a remote unit connected to the first IP network;

in response to the detection of at least some of the first signalling packets, associating a second RSVP session in the second IP network with the tunnel identity included in the data units in which the first packets of the application flow are encapsulated, the second session being relative to a flow of at least some of the second packets in which the data units are encapsulated between the gateway router and the switching node; and transmitting second signalling packets in the second IP network for establishing and/or updating parameters of the second session associated with the tunnel identity.

2. Method according to claim 1, wherein the association of the second RSVP session with the tunnel identity includes assigning quality-of-service parameters to the second RSVP session, selected according to quality-of-service parameters assigned to the first RSVP session and obtained from the first signalling packets detected.

3. Method according to claim 1, wherein the step of detecting first signalling packets is performed at the level of the first interface of the gateway router.

4. Method according to claim 3, wherein the application flow of first packets is a downlink flow, from the remote unit connected to the first IP network towards the radio terminal.

5. Method according to claim 4, wherein, in response to the detection of the RESV message, the gateway router associates the second RSVP session with the tunnel identity included in the data units in which the first packets of the application flow are encapsulated and sends an RSVP protocol PATH message on the second IP network to the switching node.

6. Method according to claim 3, wherein the application flow of first packets is an uplink flow, from the radio terminal to the remote unit connected to the first IP network.

7. Method according to claim 6, including the following step in response to the detection of at least some of the first signalling packets at the level of the first gateway router interface: transmission from the gateway router to the switching node, through the intermediary of the second IP network, of a control message belonging to a control plane of the tunnel protocol and designating the tunnel identity included in the data units in which the first packets of the application flow are encapsulated, and wherein the association of the second RSVP session with the tunnel identity designated in the control message is performed by the switching node.

8. Method according to claim 7, wherein the control message designating the tunnel identity also contains at least some quality-of-service parameters of the first RSVP session.

9. Method according to claim 8, wherein, in response to the detection of the control message, the switching node associates the second RSVP session with the designated tunnel identity and sends an RSVP protocol PATH message on the second IP network to the gateway router.

10. Method according to claim 1, wherein the radio access network includes control units provided with network interfaces communicating with the first interface of at least a switching node via the intermediary of a third IP network, at least a part of the tunnel protocol being implemented between the network interfaces of the control units and the first interface of the switching node, and wherein, in response to the association with the tunnel identity of the second RSVP session relative to the flow of the second packets in which the data units of the tunnel protocol are encapsulated between the gateway router and the switching node, there is associated with the tunnel identity a third RSVP session in the third IP network, for transporting between the switching node and a radio access network control unit, IP packets in which the data units are encapsulated.

11. Gateway router having a first interface for exchanging first packets along a first IP network and a second interface for exchanging second packets along a second IP network, the gateway router forming an edge router of the first IP network, set up for exchanging at least some of the first packets with radio terminals in a single hop of the first IP network, each of the first packets exchanged being encapsulated in at least one data unit of a tunnel protocol implemented between the second interface and a switching node, the data unit including a tunnel identity and itself being encapsulated in at least a second packet exchanged along the second IP network, the gateway router comprising:

means for detecting on the first interface first signalling packets carrying RESV messages of an RSVP protocol concerning a first session of the RSVP protocol in the first IP network relative to an application flow of at least some of the first packets between a radio terminal and a remote unit connected to the first IP network;

means for associating, in response to the detection of at least some of the first signalling packets, a second RSVP session in the second IP network with a tunnel identity included in the data units in which the first packets of the application flow are encapsulated, the second RSVP session being relative to a flow of at least some of the second packets in which the data units are encapsulated between the second interface and the switching node;

means for transmitting second signalling packets in the second IP network for establishing and/or updating parameters of the second RSVP session associated with the tunnel identity.

12. Gateway router according to claim 11, wherein the application flow of at least some of the first packets is a downlink flow, from the remote unit connected to the first IP network towards the radio terminal, and wherein the means for associating the second RSVP session with the tunnel identity include means for including a UDP port number allocated to the application flow in some parameters of the second RSVP session.

13. Gateway router according to claim 12, wherein the means for transmitting second signalling packets include means for sending an RSVP protocol PATH message on the second IP network to the switching node.

14. Gateway router according to claim 11, wherein the application flow of at least some of the first packets is an uplink flow, from the radio terminal to the remote unit connected to the first IP network, and wherein the means for associating the second RSVP session with the tunnel identity include means for transmitting to the switching node, through the intermediary of the second IP network, a control message belonging to a control plane of the tunnel protocol and designating the tunnel identity included in the data units in which the first packets of the application flow are encapsulated.

15. Gateway router according to claim 14, wherein the control message designating the tunnel identity further contains at least some of the quality-of-service parameters of the first RSVP session.

16. Cellular radio communication system core network switching node including a first interface with a radio access network providing links with radio terminals and a second interface for exchanging packets along an IP network with at least a gateway router, the packets carrying data units of a tunnel protocol supported by the second interface, each data unit including a tunnel identity and data forming either a control message if the data unit belongs to a control plane of the tunnel protocol, or user data if the data unit belongs to a user plane of the tunnel protocol, the switching node also including means for associating, in response to receiving from the gateway router a tunnel protocol special data unit belonging to the control plane, a session of an RSVP protocol in the IP network with the tunnel identity designated in the control message of the special data unit and transmitting to the gateway router at least one signalling packet in the IP network for setting and/or updating parameters of the session associated with the tunnel identity designated in the control message, the RSVP session being relative to a packet flow in which data units are encapsulated, the data units being of the tunnel protocol belonging to the user plane and containing the tunnel identity designated in the control message, the first interface of the switching node supporting an IP protocol and the user plane of the tunnel protocol for communicating with control units of the radio access network, and the switching node further including means for associating, in response to the association with the tunnel identity of an RSVP session relative to a flow of packets in which data units of the tunnel protocol belonging to the user plane and containing the tunnel identity are encapsulated between the switching node and the gateway router, another RSVP session with the tunnel identity, for transporting between the switching node and a radio access network control unit, IP packets in which the data units are encapsulated.

17. Switching node according to claim 16, wherein the signalling packet includes quality-of-service parameters contained in the control message.

18. Switching node according to claim 16, wherein the signalling packet carries an RSVP protocol PATH message.

* * * * *